United States Patent [19]

Starlinger-Huemer

[11] Patent Number: 4,898,637
[45] Date of Patent: Feb. 6, 1990

[54] PROCESS FOR THE MANUFACTURE OF A TUBULAR SEMIMANUFACTURED ARTICLE MADE FROM PLASTIC FOR THE FABRICATION OF CONTAINER SACKS

[76] Inventor: Franz X. Starlinger-Huemer, Sonnenuhrgasse 4, 1060 Vienna, Austria

[21] Appl. No.: 119,464

[22] Filed: Nov. 10, 1987

[30] Foreign Application Priority Data

Nov. 11, 1986 [CH] Switzerland ............ 04500/86

[51] Int. Cl.⁴ ............................. B28B 21/52
[52] U.S. Cl. ..................... 156/172; 156/149; 156/187; 156/188; 156/192; 156/244.12; 156/244.13; 156/244.14; 156/244.15
[58] Field of Search ............ 156/244.12, 244.13, 156/244.14, 244.22, 244.25, 149, 187, 192, 217, 218, 244.15, 172, 188; 425/133.1

[56] References Cited

U.S. PATENT DOCUMENTS 2,888,954  6/1959  Gates .......................... 156/149
3,370,999  0/0000  Schwarzrock ............... 156/172
4,495,018  1/1985  Vohrer ......................... 156/187

FOREIGN PATENT DOCUMENTS 0019871  6/1973  Japan .......................... 156/187

*Primary Examiner*—Caleb Weston
*Attorney, Agent, or Firm*—Herbert Dubno

[57] ABSTRACT

The process for the manufacture of a tubular semimanufactured article made from plastic (synthetic resin) for the fabrication of sacks comprises at least one tubular extrudate made from a thermoplastic film, said extrudate reinforced with narrow strands or tapes made from plastic or the like and extruded around the circumference and/or along the length thereof, and a second tubular covering or jacket extrudate made from a thermoplastic film which is applied onto said first reinforced plastic film, whereupon the assembly is bonded together in a soft and warm condition. In this connection, said second tubular plastic film is applied in the form of at least one individual, preferably continuously delivered, film run or web, said film run being welded or bonded together at its edges, thus forming the tubular covering or jacket film.

1 Claim, 1 Drawing Sheet

4,898,637

PROCESS FOR THE MANUFACTURE OF A TUBULAR SEMIMANUFACTURED ARTICLE MADE FROM PLASTIC FOR THE FABRICATION OF CONTAINER SACKS

FIELD OF THE INVENTION

The present invention relates to a process for the manufacture of a tubular semimanufactured article made from plastic (synthetic resin) for the fabrication of packing sacks and large-volume container sacks. The process comprises extruding at least one tubular extrudate of a thermoplastic film reinforced with narrow strands or tapes made from plastic or the like extruded around the circumference and/or along the length thereof, and a second tubular covering or jacket extrudate made from a thermplastic film, whereupon the assembly is bonded together in a soft and warm condition.

BACKGROUND OF THE INVENTION

Apart from tubular semimanufactured articles made from narrow plastic tapes and fabricated on circular looms, tubular plastic film made from a softenable thermoplastic manufactured by extrusion machines, are also employed in the manufacture of packing sacks, large-volume container sacks and other receptacles.

So that that such receptacles will have the necessary carrying strength, the reinforcement technique employed in the fabrication of hoses has basically been adopted.

Accordingly, it is customary with newer processes to reinforce an extruded tubular film of thermoplastic with narrow strands or tapes made from plastic, extending, for example, helically around the circumference of said first extrudate. Then a second tubular film of thermoplastic may be applied in co-extruding manner as a covering or jacket.

Seen from the point of view that such processes serve the mass production of finished products, a significant disadvantage results here owing to the high consumption of material which results on the co-extrusion of said outer jacket film due to the inevitable thickness of the wall of said tubular extrudate, although from the strength of such finished products, the wall strength of said jacket film could be somewhat less.

OBJECT OF THE INVENTION

It is thus the object of the present invention to provide a process for the manufacture of a tubular semimanufactured article of plastic for the fabrication of container sacks in such a way that a jacketing of said reinforced tubular extrudate is possible with a film having a lesser wall thickness than was hitherto possible.

SUMMARY OF THE INVENTION

This is achieved according to the invention in that said second tubular plastic film is applied in form of at least one individual, preferably continuously suppled, film run or web, said film run being welded or bonded together at its edges, thus forming the tubular covering or jacket film.

By these tapes, it is not only possible to bond together any desied thin film run in order to provide said tubular jacket film, but also, moreover, to adapt the wall thickness of said jacket film according to requirements, for which said delivery spool of film run need merely to be exchanged.

In view of the mass production of the finished article, this is of greatest economic importance.

Accordingly, it is appropriate that said individual run of film, brought forward for the development of said jacket film, is applied to the surface of the reinforced tubular extrudate from delivery means via guide rollers, whereby said run of film can be applied spaced along the length of said reinforced tubular extrudate and distributed uniformly around the circumference thereof, or said run of film can encircle and extend helically said reinforced tubular extrudate.

To bond said run of film, it is moreover advantageous that said run of film is bonded together at its edges in a soft and warm condition in the vicinity of a heatable inner calibrating ring.

It is, moreover, possible to bond said inner and said outer tubular extrudates together directly between another through the gaps in said reinforcement layer, in the course of which it is of advantage when said thermoplastic material of said inner and said outer tubular film is of a melting temperature below the melting temperature of said material of said reinforcement.

These steps permit a fixed wall build-up for the receptacle, without the slightest impairment of the strength of said reinforcement strands, since said reinforcement strands take no part in the welding or bonding process.

For this welding or bonding process, it is advantageous when said inner reinforced and said outer tubular plastic films are bonded toether directly in a warm and soft condition in the region of said inner calibrating ring.

Furthermore, the present invention relates to a receptacle that is manufactured according to the process of of the invention.

BRIEF DESCRIPTION OF THE DRAWING

Embodiments of the present invention will now be more particularly described by way of example and with reference to the accompanying drawing, in which.

SPECIFIC DESCRIPTION

Figure 1:
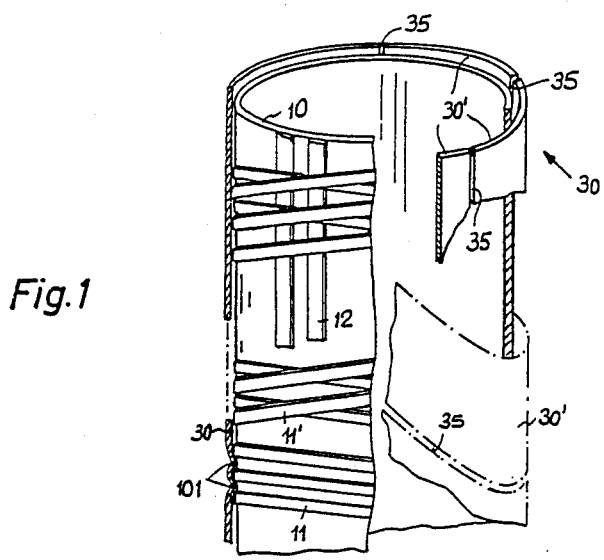
FIG. 1 is a schematic, diagrammatic and partially sectional representation of a semimanufactured article according to the process of the invention for the fabrication of receptacles.

For the elucidation of the process according to the invention for the fabrication of a tubular semimanufactured article made of plastic (synthetic resin) which permits the fabrication of packing sacks, large-volume container sacks or suchlike receptacles of the aforementioned type, reference may be made tto the semimanufactured article illustrated in FIG. 1, in which several variants in the structural build-up are represented in different areas.

The article starts with a tubular extrudate 10 made from a softened thermoplastic that, while still in a warm and soft state or, drawn from the delivery roll has been brought again into a warm, soft state, is reinforced with narrow strands or tapes made of a plastic and extruded around the circumference 11 or 11' and/or along the length 12 thereof.

As is illustrated in detail in FIG. 1 from bottom to top or from left to right, said tubular plastic film 10 can be wrapped around continuously with a narrow plastic strand 11. Furthermore, said plastic film 10 can, in addition, be wrapped around with one further narrow plastic strand 11', extending in an opposite sense from that of the first-mentioned strand, whereby points of intersection result. By itself or also in addition to an alaround film strand 11 or to both 11 and 11', the tubular plastic flm 10 can be reinforced by a plurality of film strands 12 spaced about the circumference of said first extrudate and extending in a longitudinal direction thereof. Moreover, it can be seen in FIG. 1 at the upper and right section of the illustrated assembly that a further tubular plastic jacket film 30 is applied onto the first reinforced assembly 10,11,11',12.

Thus far, such semimanufactured articles, respectively, processes for the fabrication thereof, are known.

According to the invention, however, the further tubular plastic film 30 is applied in the form of at least one individual, preferably continuously delivered, film run or web 30+, said film run 30' being welded or bonded together at its edges, thus forming the tubular covering or jacket film.

In this connection, as wll be explained in more detail, said individual run of film 30', is brought forward for the development of said jacket film 30, can be applied to the surface of said reinforced tubular extrudate 10 from delivery means via guide rollers.

As is also illustrated in FIG. 1, said run of film 30' can be applied spaced along the length of said reinforced tubular extrudate 10 and distributed uniformly around the circumference thereof, or, on the other hand, as is represented by the dot-dash line, said run of film 30' can encircle and extend helically said reinforced tubular extrudate 10.

Figure 2:
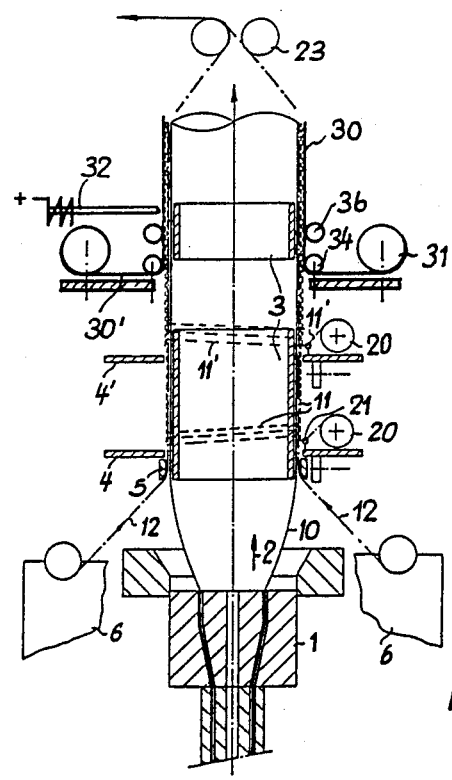
FIG. 2 is a schematic cross sectional view of an arrangement for the execution of the process according to the invention, and for the fabrication of the semimaufactured article according to FIG. 1.

Preferably, said run of film 30' is then bonded together at its edges 35 in a soft and warm condition in the vicinity of a heatable inner calibrating ring 3 (FIG. 2).

Preferably, a welding or bonding takes place in a heating zone, which also permits the plastic threads or tapes 11,11' and 12 to be heated for a short time to bring about an intimate bonding between said extruded tubular film 10 and said jacket film 30 as well as said encircling tapes 11 and 11' and said longitudinal tapes 12. In particular, moreover, as is indicated at the bottom left of FIG. 2, said film tape 11, which serves as a reinforcement tape, can be applied to the inner tubular extrudate 10 with greater spacing, and the whole assembly is covered by said outer tubular jacket film 30, with said inner 10 and said outer tubular extrudate 30 being bonded together directly between another through the gaps 101 in said reinforcement layer 11. Here it is advantageous for said thermoplastic material of said inner 10 and said outer tubular film 30 to be of a melting temperature below the melting temperature of said material of said reinforecment 11. In this way it is guaranteed that the reinforcement 11 does not take part in the welding process, thereby retaining its complete strength.

An article manufactured in the aforementioned manner is cut to length in an ensuing method of operation and then, on its bottom side, sewn up or gathered and knotted or cemented or treated in some other way for the fabrication of a receptacle.

To be able to execute the process according to the invention rationally, a preferably multistage arrangement according to FIG. 2 is provided, which permits a manufacture of all aforementioned embodiments described with the aid of FIG. 1.

FIG. 2 shows an inner hose 10 made from PVC or similar material and having a wall thickness of, for example, 0.3–0.5 mm and being extruded from an extrusion nozzle 1. Said inner hose 10, which is being acted upon through said extrusion nozzle by internal pressure, indicated by the arrow 2, arrives, in production direction, first in a guide ring 5 and is expanded against the inner wall thereof. Said extrusion nozzle 1 is disposed upstream resp. in in the vicinity of an inner calibrating ring 3. Said calibrating ring 3 is here encircled by a first thread or narrow-tape laying device 4, which is, for example, here driven circularly counterclockwise in order to reinforce said tubular plastic film 10 with said narrow tape 11.

For a reinforcement with a further circumferential tape 11', a further narrow-tape laying device 4' is provided, which is now driven preferably clockwise. In appropriate manner (not illustrated here in detail), said narrow-tape laying devices 4 and 4' carry supply coils 20 from which said narrow tapes 11,11' are wound off by way of thread eyes 21.

For application of longitudinal reinforcement, said inner calibrating ring 3 is encircled on the leading edge by said guide ring 5 for the continuous bringing-forward of the longitudinal tape 12 onto said plastic film 10, or onto said calibrating ring 3. Preferably, said longitudinal tape is thereby drawn off from a conventional spool rack 6.

In order now to encircle said reinforced inner extrudate 10 with a further tubular jacket extrudate 30 of the least wall strength as may be required, for example 0.1 mm, which is not possible by co-extrusion, said further tubular jacket film is applied in the form of individually delivered film runs 30'. For this pupose, stationary delivery spools 31 and guide rollers 34 are provided, which lay said individual runs 30' all around and onto said reinforced inner extrudate 10, and which are disposed approximately at the hight of said further inner calibrating ring 3. Heatable pressure rolls 36 in the vicinity of the edges of said neighboring film runs 30' bring about a continuous welding of said film runs 30' for the formation of said jacket film 30.

After said welding of said edges, or simultaneously, a thermo-welding apparatus 32 can then bond said inner and said outer tubular films 10 and 30 together directly between another through said gaps in said reinforcement.

If said flm runs 30' are to extend helically around said reinforced tubular extrudate, a circular-driven run-laying device, similar to said aforementioned run-laying device 4, can be provided, which lays said film run while circulating (not shown).

As easily noticeable, such arrangement permits the realization of all the previously-mentioned processing sections individually or combined.

The drawing-off of the article thus manufactured, takes place continuously and in customary manner, for which the manufactured tubular product is preferably laid together between draw-off rollers 23 and from these transported further, for example directly to a receptacle-make-up arrangement or the like. According to this drawing-off speed, said circumferential tapes 11 and 11' or the longitudinal tapes 12 or said film run 30' for said jacket 30 are drawn off.

Of course, within the bounds of the aforementioned process and the device, a number of modifications are possible without deviating from the basic idea of the invention. In particular, apart from the mentioned narrow film tapes, every kind of suitable thread forms or strands are possible, such as filaments, yarn, threads and the like. Further, for example, the one or the other heatable inner calibrating rings can, if required, be coolable.

When drawing off said inner film, which is to be reinforced and jacketed, from a delivery spool, it is of advantage that the fabrication process can be interrupted at any time for changing the spool on the tape or the run-laying device, which is more difficult when reinforcing and jacketing immediately after extruding.

In any case, the process according to the invention can be effected discontinuously.

Further, the welding can also take place under pressure by hot air applied from the outside, for example, by means of pressure rolls arranged circumferentially. This applies to the welding toether of the edges of the film run as well as also to the welding together of the inner and outer films through the gaps in the reinforcement.

What I claim is:

1. A process for the maufacture of a sack, comprising the steps of:

extruding a tubular extrudate composed of a thermoplastic film;

laying longitudinal reinforcement strands in spaced apart relationship along said tubular extrudate;

laying at least two reinforcement strands onto said tubular extrudate and said longitudinal reinforcement strands in helical patterns in spaced-apart turns in opposite senses to form a reinforcement layer thereon extending along and around said tubular extrudate, so that gaps between said turns register with gaps between said longitudinal strands and are throughgoing through said reinforcement layer;

continuously delivering at least one thermoplastic film web from a roll to and winding said at least one film web around said reinforcement layer so that successive web turns have adjoining edges and bonding said adjoining edges together by heating to a soft and warm condition in the vicinity of a heated inner caibrating ring so that said turns from a continuous jacket around said reinforcement layer, said film and said film web being composed of thermoplastic material having melting temperatures below the melting temperatures of said strands;

thermally bonding said jacket through said throughgoing gaps directly to said tubular extrudate without bonding said jacket to said reinforcement layer to form a tube; and forming a sack from said tube.

* * * * *